Aug. 25, 1953

C. A. LUNDEEN 2,650,070

PIPE GRIPPING MECHANISM FOR POWER TONGS

Filed April 8, 1950

CHESTER A. LUNDEEN
INVENTOR.

BY Lyon & Lyon
ATTORNEYS

Aug. 25, 1953 C. A. LUNDEEN 2,650,070
PIPE GRIPPING MECHANISM FOR POWER TONGS
Filed April 8, 1950 6 Sheets-Sheet 3

CHESTER A. LUNDEEN
INVENTOR.

BY Lyon & Lyon
ATTORNEYS

Aug. 25, 1953     C. A. LUNDEEN     2,650,070
PIPE GRIPPING MECHANISM FOR POWER TONGS
Filed April 8, 1950     6 Sheets-Sheet 4

CHESTER A. LUNDEEN
INVENTOR.

BY
ATTORNEYS

Aug. 25, 1953     C. A. LUNDEEN     2,650,070
PIPE GRIPPING MECHANISM FOR POWER TONGS
Filed April 8, 1950     6 Sheets-Sheet 5

CHESTER A. LUNDEEN
INVENTOR.

BY
ATTORNEYS

Patented Aug. 25, 1953

2,650,070

UNITED STATES PATENT OFFICE 2,650,070

PIPE GRIPPING MECHANISM FOR POWER TONGS

Chester A. Lundeen, Los Angeles, Calif., assignor to Byron Jackson Co., Los Angeles, Calif., a corporation of Delaware Application April 8, 1950, Serial No. 154,820

15 Claims. (Cl. 255—35)

This invention relates to power tongs and is particularly directed to improvements in pipe gripping mechanism employed in such devices. This invention relates to improvements over the device shown in my copending application for power tong, Serial No. 794,745, filed December 30, 1947, now Patent No. 2,618,463 issued November 18, 1952.

The principal object of this invention is to provide an improved form of pipe gripping mechanism which is effective to grip the pipe for turning it, but which avoids crimping the pipe under the action of the pipe gripping jaws.

A related object is to provide a power tong device having relatively movable pipe gripping jaws which are effective to grip the pipe without imposing excessive crushing stresses upon it.

Another object is to provide a pipe gripping mechanism of this type in which the ratio of inward gripping pressure of the jaws to the torque applied for turning the jaws is inversely proportional to the depth of penetration by the jaw dies together with the amount of inward flexure of the pipe under gripping action by the jaws. With this construction the jaws grip the pipe with sufficient inward radial force to prevent slippage of the jaw dies on the pipe surface, and yet this inward radial force is maintained below values which might permanently crimp the pipe.

Another object of this invention is to provide a power tong device having a rotary ring and a pipe gripping mechanism turnably supported coaxially of the ring by means of rollers on the ring, the pipe gripping mechanism including a pivoted jaw engaged by one of the rollers to move it toward pipe gripping position.

Another object is to provide a device of this type in which the pipe gripping mechanism includes a carrier having a fixed jaw and a pivoted jaw connected thereto, the carrier and jaws being constructed so that the rollers which support the carrier also directly engage both the fixed and pivoted jaws.

Another object is to provide a construction of this type in which the fixed and pivoted jaws are reversible on the carrier for turning the pipe in either direction.

A further object is to provide a pipe gripping mechanism of this type wherein the pivoted jaw is engaged by one roller and disengaged by another.

A still further object is to provide a device of this type in which a single roller acts against a face on the pivoted jaw to move it toward operative pipe gripping position and also acts against a retracting finger on the jaw to swing it away from operative position.

Other objects and advantages will appear more fully hereinafter.

Referring to the drawings, the power tong mechanism includes a frame 10 which rotatably supports an integral ring 11 by means of a plurality of rollers 12. The ring 11 has a side opening 13 which may be aligned with a side opening 14 provided on the frame. When the openings 13 and 14 are thus aligned the tong device may be applied laterally to a pipe 15, the pipe entering the opening and passing to a central position with respect to the ring 11. The pipe gripping mechanism embodying my present invention is generally designated 16 and is positioned coaxially of the ring 11.

A drive sprocket 17 secured to the ring 11 is engaged by an endless chain 18 so that it may be driven. The chain passes over the idler sprockets 19 mounted on the frame and is driven by the drive sprocket 20. This drive sprocket 20 is in turn driven from a two speed transmission generally designated 21. The transmission 21 receives power from any convenient source such as, for example, an air motor (not shown), which may be mounted on the frame 10. The air motor may be controlled by means of a valve assembly 22 imposed in the air supply line 23. The construction of the power tong device, with the exception of the ring 11 and the pipe gripping mechanism 16, is substantially the same as that disclosed in my copending application referred to above.

In accordance with my invention, the ring 11 is provided with conical surfaces 24 which are received by the grooved supporting rollers 12. The ring 11 is thus rotatably supported on the frame 10 and is held against axial movement. The pipe gripping mechanism generally designated 16 is rotatably supported on the ring 11 by means of the rollers 25, 26, 27, 28 and 29. Each of these rollers is mounted on a bushing 30 which encircles a mounting pin 31. The head 32 of the pin is received by the upper flange 33 of the ring 11, while the lower end of the pin 31 is threaded into the lower flange 34.

The pipe gripping mechanism 16 which is supported on these rollers includes a jaw carrier 35 having upper and lower arcuate flanges 36 and 37 connected by an arcuate web 38. This web 38 extends for a shorter distance circumferentially than the flanges 36 and 37 so that slots 39 are formed between the flanges at the ends of the web 38. A bushing or double jaw 40 is fixed on the carrier 35 by means of the pin 41 passing through aligned apertures 67 and 68. A single jaw 42 is pivoted to the carrier 35 by means of the pivot pin passing through aligned apertures 69 and 70. The jaws 40 and 42 are each mounted within one of the slots 39 formed between the flanges 36 and 37 on the carrier 35. The arcuate surface 65 on the back side of the double jaw 40 fits the curved surface 66 within the carrier 35. The periphery of each of the rollers 25—29 extends between the flanges 36 and 37 so that the carrier 35 is held against axial movement. Furthermore, these rollers contact the arcuate surface 44 of the jaw 40, the arcuate surface 45 of the web 38, and the cam surface 46 on the jaw 42. The rollers 25—29 therefore maintain the pipe gripping assembly 16 centrally of the ring 11.

Figure 10:
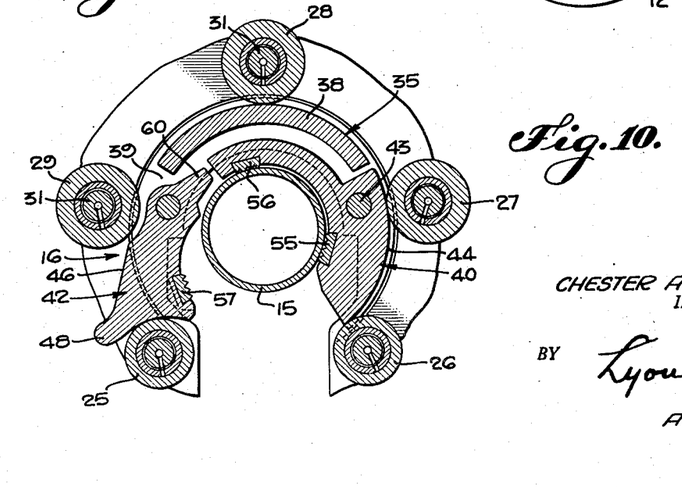
Figure 10 is a sectional plan view similar to Figure 2 showing the fixed and pivoted jaws assembled in interchanged position on the jaw carrier for turning the pipe in reverse direction.

The carrier 35 and ring 11 are each symmetrical with respect to a diametric plane passing through its rotary axis and passing midway between the sides of the openings 13 and 14. This symmetrical construction enables the jaws 40 and 42 to be interchanged in position when desired in order to turn the pipe 15 in either direction. In order to effect this interchange, the duplicate pins 41 and 43 are each unthreaded from the upper flange 36 of the carrier 35 and then withdrawn upwardly. The jaws 40 and 42 may then be interchanged in the slots 39 and the pins 41 and 43 reinserted and threaded into place. The upper ends of the pins may be squared as shown at 47 in order to facilitate turning by means of a wrench (not shown). The jaws as thus interchanged are shown in Figure 10.

The cam surface or engagement surface 46 on the pivot jaw 42 extends between an outwardly directed retracting finger 48 and an arcuate shaped recess 49. This surface 46 is engaged by the periphery of the roller 27 when the ring 11 is turned with respect to the carrier 35. This relative turning motion is effected by causing the endless chain 18 to turn the sprocket 17. A friction band 50 having suitable lining 51 is fixed to stationary pins 52 carried by the frame cover 53. This stationary band 50 encircles a portion of an upright rim 54 provided on the upper flange 36 of the carrier 35. The stationary band 50 and lining 51 impose a friction drag on the carrier 35 so that the carrier 35 is normally held stationary at the start of rotary movement of the ring 11. When the periphery of the roller 27 engages the cam surface 46 the pivoted jaw 42 is swung inwardly toward operative position to engage the pipe 15. The jaws 40 and 42 may be provided with hardened dies 55, 56 and 57 of conventional type for engagement with the outer surface of the pipe. When the die 57 engages the pipe 15 the jaw 42 and carrier 35 are caused to rotate in unison with the ring 11, thereby turning the pipe 15.

Figure 1:
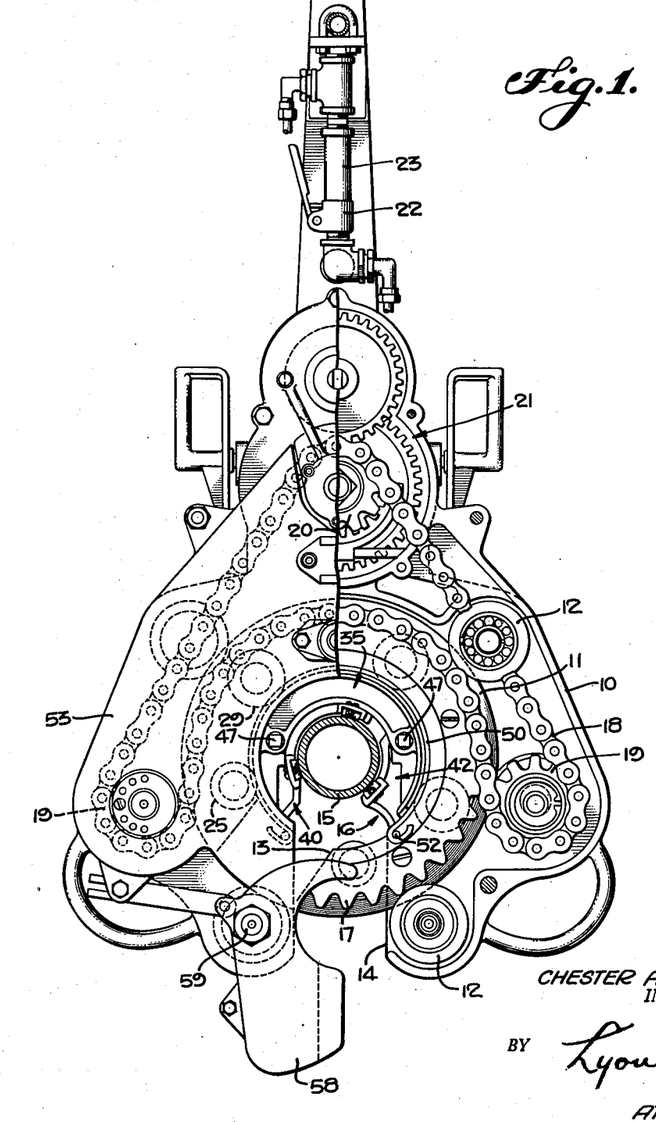
Figure 1 is a top plan view partly broken away showing a power tong embodying my invention.
Figure 2:
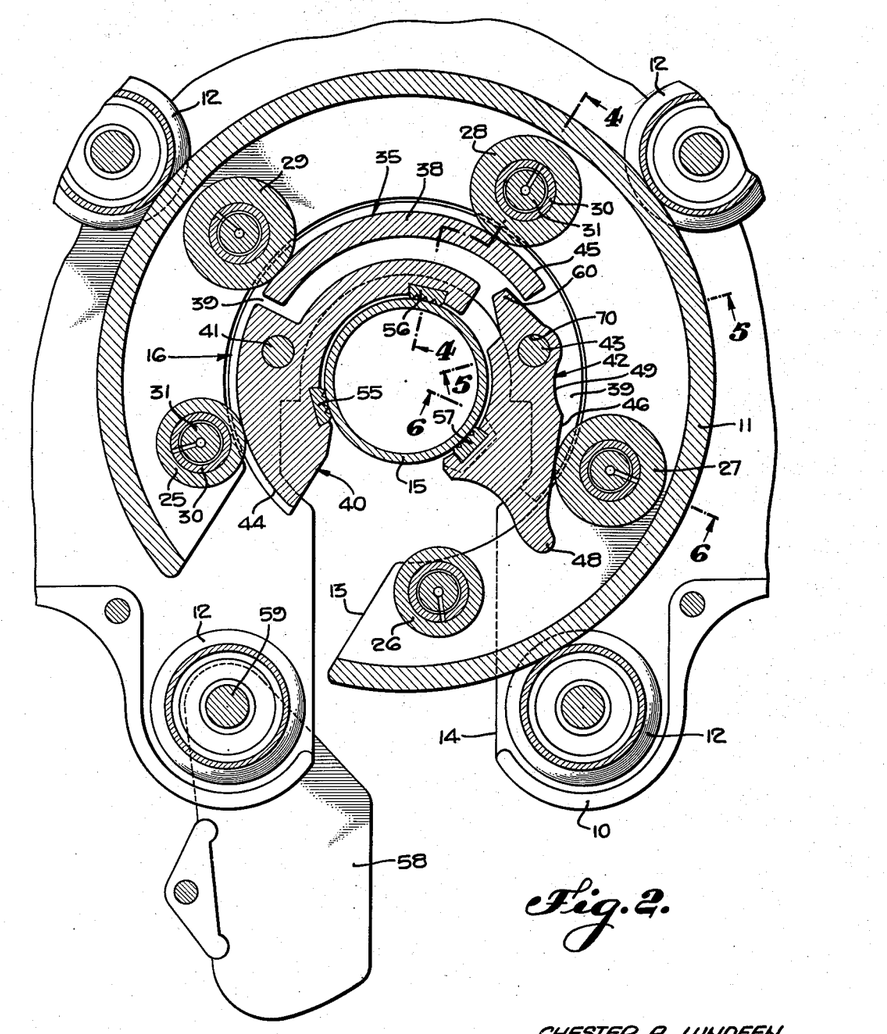
Figure 2 is a sectional plan view showing details of the mounting of the ring and the pipe gripping mechanism, the jaws being in operative pipe gripping position.
Figure 3:
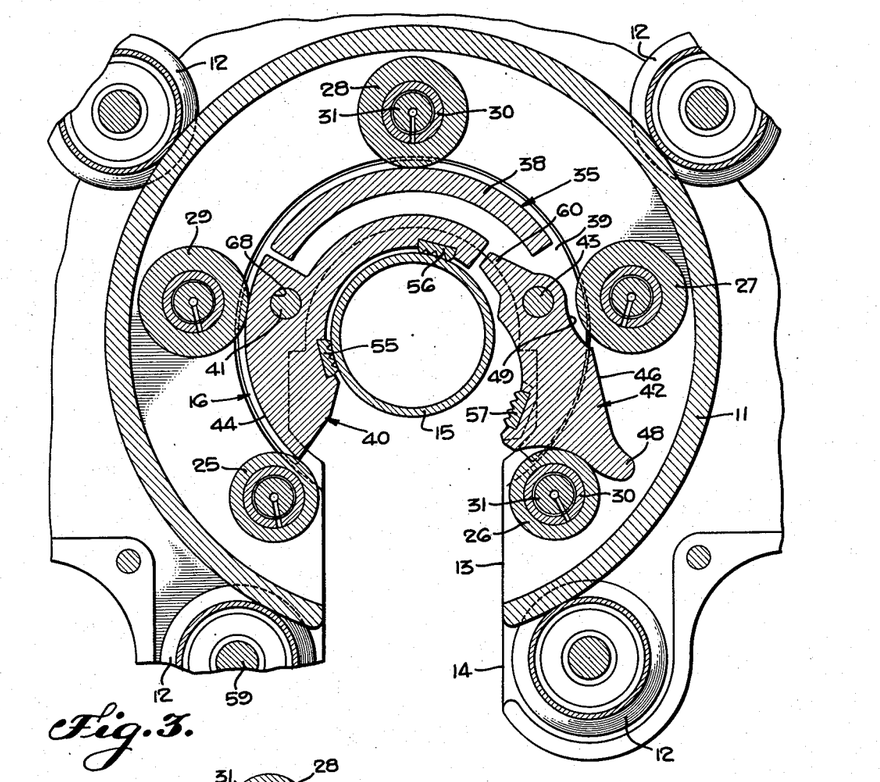
Figure 3 is a sectional plan view similar to Figure 2 showing the pivoted jaw in retracted position.
Figures 4, 5, 6:
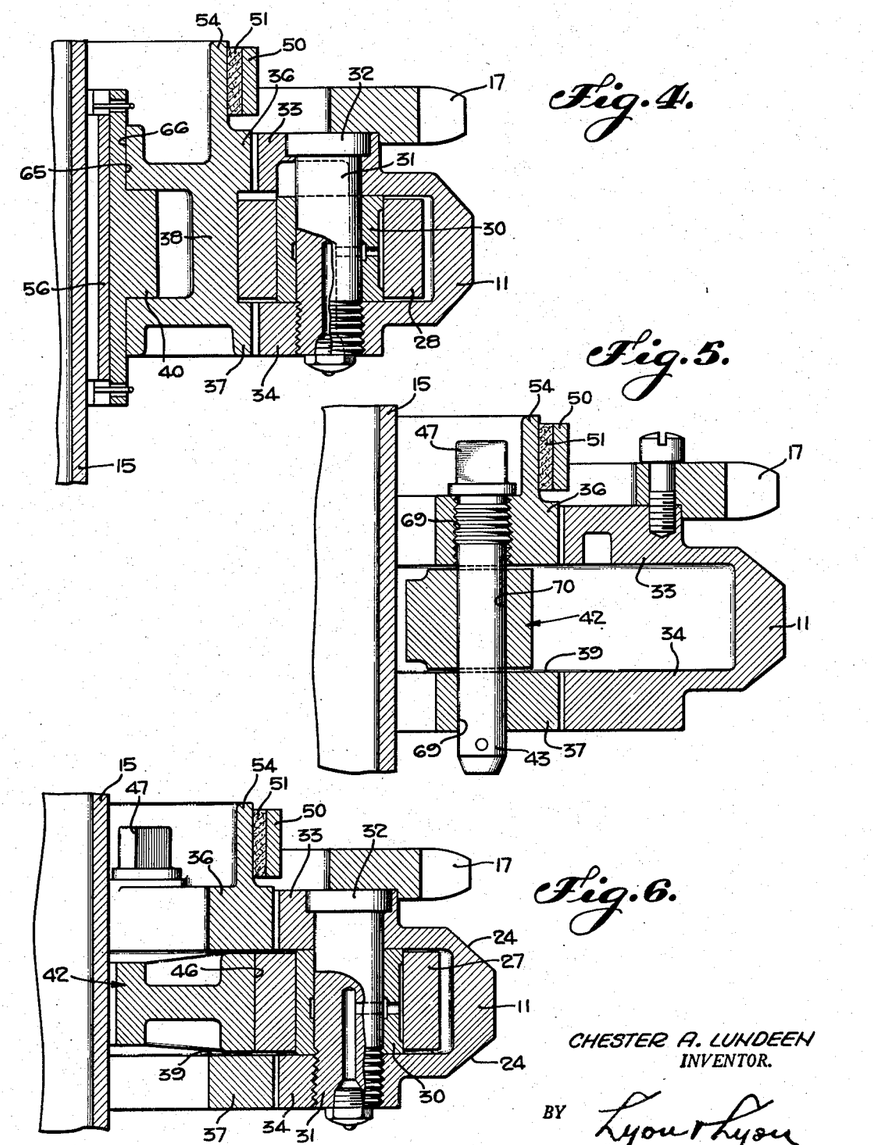
Figures 4, 5 and 6 are sectional elevations taken substantially on the lines 4—4, 5—5, and 6—6 as shown in Figure 2.
Figure 7:
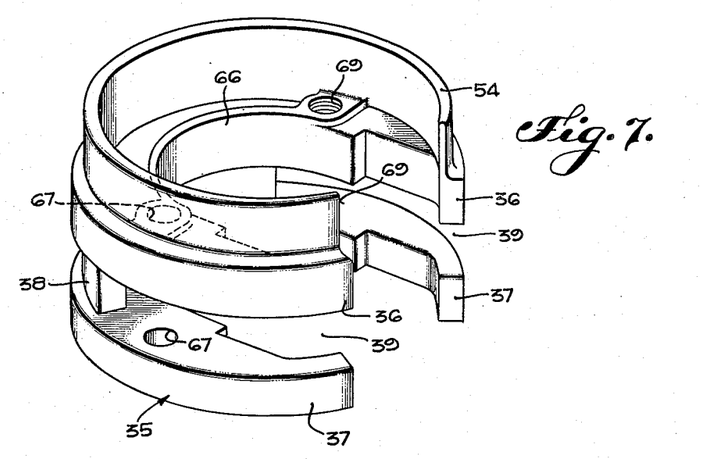
Figure 7 is a perspective view of the jaw carrier.
Figures 8, 9:
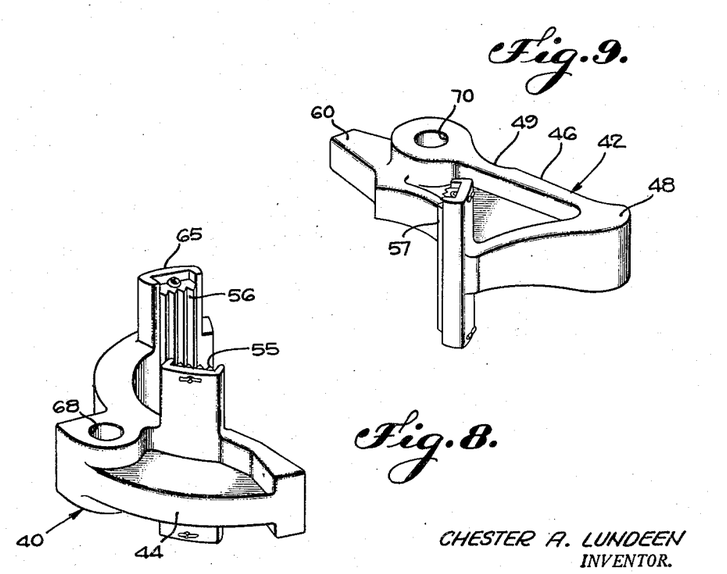
Figure 8 is a perspective view of the fixed double jaw.
Figure 9 is a perspective view of the pivoted jaw.

It will be observed that the squeezing force applied to the pipe 15 is developed by the engagement of the roller 27 with the cam surface 46 on the pivoted jaw 42. The shape of this surface 46 may be generated as desired in order to apply as great a force as is necessary to prevent slippage of the dies 55, 56 and 57 on the pipe without applying excessive compressive forces which might permanently crimp the pipe. In other words, the ratio of the torque applied to the ring 11 to the maximum squeezing force applied to the pipe 15 may be set at any desired value by varying the shape of the cam surface 46. I have found that this surface 46 may be formed as a plane on the angle shown in the drawings to provide adequate squeezing force on the pipe without imposing excessive compression stresses which might permanently crimp it. As the roller 27 moves away from the pivot pin 43, the moment arm of the force exerted on the jaw 42 increases, but the magnitude of the force decreases sharply because of the change in wedge angle of the surface 46. Hence, the torque applied to the jaw 42 decreases and the crushing force applied by the die 57 to the pipe 15 decreases correspondingly. The pipe gripping mechanism 16 may be moved from operative to inoperative position simply by reversing the direction of rotation of the ring 11. This is accomplished by reversing the direction of drive of the air motor (not shown) or change-speed transmission 21 so that the endless chain 18 turns the sprocket 17 in the other direction. As shown in Figure 2 the ring 11 is moved counterclockwise so that the roller 27 moves toward the pin 43 and so that the roller 26 approaches the retracting finger 48. The friction band 50 holds the carrier 35 stationary while the roller 26 engages the retracting finger 48 and moves the pivoted jaw 42 from the operative position shown in Figure 2 to the inoperative position shown in Figure 3. The recess 49 in the jaw 42 provides clearance for the roller 27 so that the jaw may be swung to its fully retracted position. Rotation of the ring 11 in counterclockwise direction is continued until its opening 13 is aligned with the opening 14 in the frame 10. The tong device may then be withdrawn laterally as the pipe moves through the openings 13 and 14. The guard 58 is pivotally mounted on the pin 59 carried by the frame 10, and this guard normally closes the entrance opening 14 when the tong device is in operative position about the pipe 15.

The pivoted jaw 42 may be provided with a stop lug 60 for engagement with the web 38 of the carrier 35 in the event that the tong device should be operated in the absence of the pipe 15. This stop lug 60 engages the web 38 in this event to limit swinging movement of the pivoted lug 42 toward engaging position.

Figure 11:
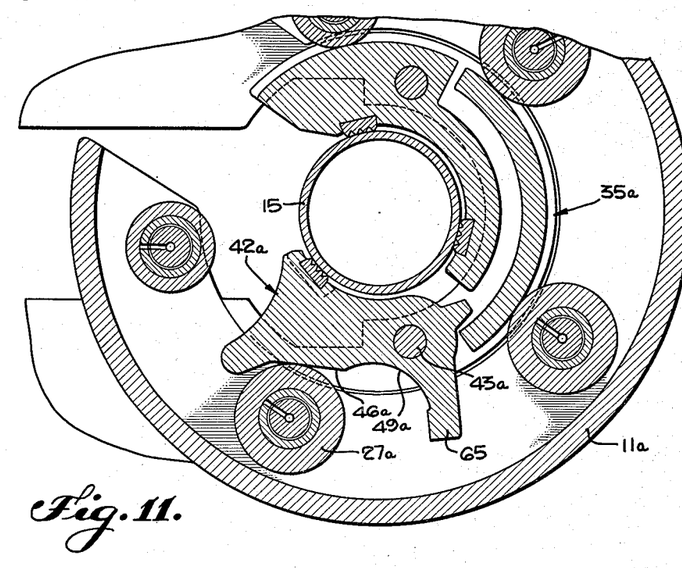
Figure 11 is a sectional plan view showing a modified form of pivoted jaw in operative position.
Figure 12:
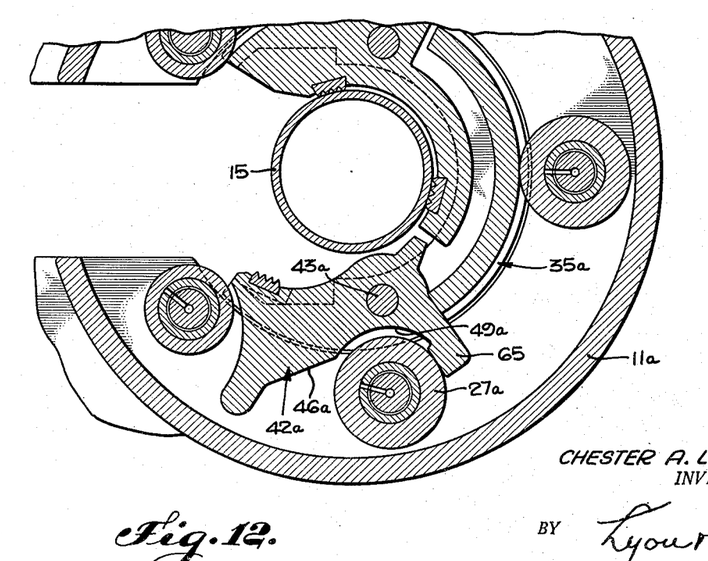
Figure 12 is a view similar to Figure 11 showing the jaw in retracted position.

In the modified form of the device shown in Figures 11 and 12, the pivoted lug 42a is provided with a retracting finger 65 which is adapted to be engaged by the same roller 27a which engages the cam surface 46a. Thus, clockwise motion of the ring 11a with respect to the jaw carrier 35a causes the periphery of the roller 27a to engage the cam surface 46a and swing the pivoted jaw 42a about the pivot pin 43a in a direction to engage the pipe 15. When the ring 11a is turned in a counterclockwise direction the roller 27a extends partially into the recess 49a and then engages the retraction finger 65 to swing the pivot jaw 42a toward inoperative position.

Having fully described my invention, it is to be understood that I do not wish to be limited to the details herein set forth, but my invention is of the full scope of the appended claims.

I claim:

1. In a power tong, the combination of: a frame, a ring rotatably supported on the frame and having a side opening through which a pipe may pass to a central position, a releasable pipe-gripping mechanism, spaced rollers associated with said ring rotatably supporting the pipe-gripping mechanism on the ring co-axially thereof, the mechanism having a pipe-gripping element mounted for movement relative thereto between an operative pipe-gripping position and an inoperative retracted position, means for relatively moving said mechanism with respect to said rollers, at least one of the rollers being disposed in the path of relative movement of said mechanism with respect thereto for engaging the pipe-gripping element to move it toward operative position upon movement of the rollers relative to the pipe-gripping mechanism.

2. In a power tong, the combination of: a frame, a ring rotatably supported on the frame and having a side opening through which a pipe may pass to a central position, a releasable pipe-gripping mechanism, spaced rollers associated with said ring rotatably supporting the pipe-gripping mechanism on the ring co-axially thereof, the mechanism having a pipe-gripping element mounted for movement relative thereto between an operative pipe-gripping position and an inoperative retracted position, means for relatively moving said mechanism with respect to said rollers, at least one of the rollers being disposed in the path of relative movement of said mechanism with respect thereto for engaging the pipe-gripping element to move it toward operative position upon movement of the roller in one direction relative to the pipe-gripping mechanism, another of the rollers being disposed in the path of relative movement of said mechanism with respect thereto for engaging the pipe-gripping element to retract it toward its inoperative position upon movement of the rollers in the other direction relative to the pipe-gripping mechanism.

3. In a power tong, the combination of: a frame, an integral ring rotatably supported on the frame and having a side opening through which a pipe may pass to a central position, a releasable pipe-gripping mechanism, spaced rollers associated with said ring rotatably supporting the pipe-gripping mechanism on the ring co-axially thereof, the mechanism having a pipe-gripping element pivotally mounted for swinging movement relative thereto between an operative pipe-gripping position and an inoperative retracted position, said pipe-gripping element having an engagement surface and a retracting finger, means for relatively moving said mechanism with respect to said rollers, at least one of the rollers being disposed in the path of relative movement of said mechanism with respect thereto for engaging said surface of the pipe-gripping element to move it toward operative position upon movement of the rollers in one direction relative to the pipe-gripping mechanism, another of the rollers being disposed in the path of relative movement of said mechanism with respect thereto for engaging the retracting finger to swing the element toward inoperative position upon turning of the rollers in the other direction relative to the pipe-gripping mechanism.

4. In a power tong, the combination of: a frame, an integral ring rotatably supported on the frame and having a side opening through which a pipe may pass to a central position, a releasable pipe-gripping mechanism including a carrier, spaced rollers associated with said ring rotatably supporting the pipe-gripping mechanism on the ring co-axially thereof, the mechanism having a jaw pivotally mounted for movement relative to the carrier between an operative pipe-gripping position and an inoperative retracted position, means for moving the rollers relative to the carrier, at least one of the rollers being disposed in the path of relative movement of the mechanism with respect thereto for engaging the jaw to pivot it toward operative position upon movement of the rollers relative to the carrier.

5. In a power tong, the combination of: a frame, an integral ring rotatably supported on the frame and having a side opening through which a pipe may pass to a central position, a releasable pipe-gripping mechanism including a carrier, spaced rollers associated with said ring rotatably supporting the pipe-gripping mechanism on the ring co-axially thereof, the mechanism having a first jaw fixed relative to the carrier, and a second jaw pivotally mounted for movement relative to the carrier between an operative pipe-gripping position and an inoperative retracted position, means for moving the rollers relative to the carrier, at least one of the rollers being disposed in the path of relative movement of the mechanism with respect thereto for engaging the second jaw to move it toward operative position upon movement of the rollers relative to the carrier, another of the rollers being disposed in the path of relative movement of the mechanism with respect thereto for engaging the second jaw to retract it upon turning of the rollers in the other direction relative to the carrier.

6. In a power tong, the combination of: a frame, an integral ring rotatably supported on the frame and having a side opening through which a pipe may pass to a central position, a jaw carrier positioned co-axially of the ring, means for turning the jaw carrier relative to the ring, a first pipe-gripping jaw fixed relative to the carrier, a second pipe-gripping jaw on the carrier pivotally mounted for swinging movement relative thereto between an operative pipe-gripping position and an inoperative retracted position, and spaced rollers on the ring rotatably supporting the carrier to maintain the carrier in position, at least one of the rollers being disposed in the path of relative movement of the pivoted jaw in its movement with the jaw carrier in respect to the ring to move the pivoted jaw toward operative position upon turning movement of the ring relative to the jaw carrier.

7. In a power tong, the combination of: a frame, a ring rotatably supported on the frame and having a side opening through which a pipe may pass to a central position, a jaw carrier positioned co-axially of the ring, means for turning the carrier within said ring, a pipe-gripping jaw on the carrier pivotally mounted for swinging movement relative thereto between an operative pipe-gripping position and an inoperative retracted position, said pipe-gripping jaw having an engagement surface and a retracting finger, spaced rollers on the ring rotatably supporting the carrier to maintain it in position, and one of the rollers engaging the said jaw surface to move the jaw toward operative position upon turning movement of the ring in one direction relative to the jaw carrier, the same roller engaging the retracting finger to swing the jaw toward inoperative position upon turning of the ring in the other direction relative to the jaw carrier.

8. In a power tong, the combination of: a frame, an integral ring rotatably supported on the frame and having a side opening through which a pipe may pass to a central position, a jaw carrier rotatably supported co-axially of the ring, a pipe-gripping jaw on the carrier pivotally mounted for swinging movement relative thereto between an operative pipe-gripping position and an inoperative retracted position, the jaw having an engagement surface and a recess, means for turning the jaw carrier relative to said ring, a force applying element on the ring movable with said ring to and from jaw engaging position, said element engaging the said surface to move the jaw toward operative position upon turning movement of the ring in one direction relative to the jaw carrier, the force applying element being movable from said surface to be received within the recess upon turning movement of the ring in the other direction relative to the jaw carrier to permit the jaw to swing to fully retracted position.

9. In a power tong, the combination of: a frame, an integral ring rotatably supported on the frame and having a side opening through which a pipe may pass to a central position, a jaw carrier positioned co-axially of the ring, a pipe-gripping jaw on the carrier pivotally mounted for swinging movement relative thereto between an operative pipe-gripping position and an inoperative retracted position, the jaw having an engagement surface and a recess, and spaced rollers on the ring rotatably supporting the carrier to maintain it in position, means for turning the ring with respect to the jaw carrier, one of the rollers engaging the jaw surface to move it toward operative position upon turning movement of the ring in one direction relative to the jaw carrier, the roller being received within the recess upon turning movement of the ring in the other direction relative to the jaw carrier to permit the jaw to swing to fully retracted position.

10. In a power tong, the combination of: a frame, an integral ring rotatably supported on the frame and having a side opening through which a pipe may pass to a central position, force transfer means on the ring, a jaw carrier supported centrally of the ring, a stationary jaw, said force transfer means being movable with said ring to and from jaw engaging position, means including a pin for attaching the jaw to one side of said carrier, a movable jaw, means including a pin for pivotally mounting the movable jaw on the opposite side of the carrier, means for turning the ring relative to the carrier, the movable jaw having an engagement surface provided on its outer portion in the path of said force transfer means so that upon turning of the ring relative to the carrier the force transfer means contacts the jaw surface to swing the jaw radially inwardly, the ring and jaw carrier being symmetrical about a diametric plane containing their common rotary axis, whereby upon withdrawal of the pins the jaws may be secured to the carrier in interchanged position.

11. In a power tong, the combination of: a frame, an intergal ring rotatably supported on the frame and having a side opening through which pipe may pass to a central position, a jaw carrier, means for turning the ring relative to the carrier, rollers on the ring supporting the carrier centrally of the ring, a stationary jaw, means including a pin for attaching the jaw to one side of said carrier, a movable jaw, means including a pin for pivotally mounting the movable jaw on the opposite side of the carrier, the movable jaw having a cam surface provided on its outer portion in the path of said rollers so that upon turning of the ring relative to the carrier one of the rollers contacts the cam surface to swing the jaw radially inwardly, the ring and jaw carrier being symmetrical about a diametric plane containing their common rotary axis, whereby upon withdrawal of the pins the jaws may be secured to the carrier in interchanged position.

12. In a power tong, the combination of: a frame, an integral ring rotatably supported on the frame and having a side opening through which pipe may pass to a central position, force transfer means on the ring, a retractible pipe-gripping assembly including a carrier supported centrally of the ring, means for turning the ring relative to the carrier, a movable jaw, said force transfer means being movable with said ring to and from jaw engaging position, means for pivotally mounting the jaw on the carrier, the jaw having a cam surface provided on its outer portion in the path of said force transfer means so that upon turning of the ring relative to the carrier the force transfer means contacts the cam surface to swing the jaw inwardly toward the pipe, the ring and jaw carrier being symmetrical about a diametric plane containing their common rotary axis, whereby the jaw may be secured to the carrier in either of two positions for turning the pipe in either direction.

13. In a power tong, the combination of: a frame, an integral ring rotatably supported on the frame, a jaw carrier supported on the ring coaxially thereof, means for turning the ring relative to the carrier, the ring and carrier each having a side opening through which the pipe may pass to a co-coaxial position, the carrier having axially spaced circumferentially extending flanges connected by an arcuate web, the web extending for an arcuate distance less than the arcuate length of the flanges whereby at least one slot is defined between the flanges, a pipe-gripping jaw pivotally mounted on the carrier within the slot for movement between an operative pipe-gripping position and an inoperative retracted position, spaced rollers on the ring contacting the web and the jaw, the jaw having a cam surface engageable by one of the rollers to move the jaw toward operative position when the ring is turned relative to the carrier.

14. In a power tong, the combination of: a frame, an integral ring rotatably supported on the frame, a jaw carrier supported on the ring co-axially thereof, means for turning the ring relative to the carrier, the ring and carrier each having a side opening through which the pipe may pass to a coaxial position, the carrier having axially spaced circumferentially extending flanges connected by an arcuate web, the web extending for an arcuate distance less than the arcuate length of the flanges whereby slots are defined between the flanges at each end of the web, a first pipe-gripping jaw fixed relative to the carrier in one of the slots, a second pipe-gripping jaw pivotally mounted on the carrier within the other slot for movement between an operative pipe-gripping position and an inoperative retracted position, spaced rollers on the ring contacting the web and the fixed and movable jaws, the movable jaw having a cam surface engageable by one of the rollers to move the jaw toward operative position when the ring is turned relative to the carrier.

15. In a power tong, the combination of: a frame, an integral ring rotatably supported on the frame, a jaw carrier supported on the ring co-axially thereof, means for turning the ring relative to the carrier, the ring and carrier each having a side opening through which the pipe may pass to a co-axial position, the carrier having axially spaced circumferentially extending flanges connected by an arcuate web, the web extending for an arcuate distance less than the arcuate length of the flanges whereby slots are defined between the flanges at each end of the web, a first pipe-gripping jaw, means including a first pin for removably securing the jaw to the carrier in one of the slots, a second pipe-gripping jaw means including a second pin for pivotally mounting the second jaw on the carrier within the other slot for movement between an operative pipe-gripping position and an inoperative retracted position, spaced rollers on the ring contacting the web and the fixed and movable jaws, the movable jaw having a cam surface engageable by one of the rollers to move the jaw toward operative position when the ring is turned relative to the carrier, the carrier being symmetrical about a diametric plane containing its rotary axis whereby upon withdrawal of the pins the jaws may be secured to the carrier in interchanged positions.

CHESTER A. LUNDEEN.

References Cited in the file of this patent

UNITED STATES PATENTS

| Number | Name | Date |
|---|---|---|
| 614,333 | McCready | Nov. 15, 1898 |
| 1,300,995 | Moody | Apr. 15, 1919 |
| 2,263,267 | Franklin | Nov. 18, 1941 |